United States Patent
Muto

[19]

[11] Patent Number: 5,908,109
[45] Date of Patent: Jun. 1, 1999

[54] RECEIVER FOR STORAGE MEDIUM DISK

[75] Inventor: Tadanobu Muto, Kazo, Japan

[73] Assignee: Kabushiki Kaisha Fukayama, Tokyo, Japan

[21] Appl. No.: 09/021,165

[22] Filed: Feb. 10, 1998

[51] Int. Cl.$^6$ .................................................. B65D 85/30
[52] U.S. Cl. ...................................... 206/308.1; 206/460
[58] Field of Search .............................. 206/308.1, 309, 206/311, 312, 313, 460

[56] References Cited

U.S. PATENT DOCUMENTS

| | | | |
|---|---|---|---|
| 4,209,091 | 6/1980 | Lieberman | 206/460 |
| 5,085,318 | 2/1992 | Leverick | 206/312 |
| 5,186,327 | 2/1993 | McCafferty | 206/312 |
| 5,299,186 | 3/1994 | Tsurushima | 206/310 |
| 5,407,067 | 4/1995 | Cotter et al. | 206/312 |
| 5,513,749 | 5/1996 | Simmons | 206/313 |
| 5,715,934 | 2/1998 | Tobol et al. | 206/308.1 |
| 5,748,608 | 5/1998 | Spector | 206/312 |
| 5,769,216 | 6/1998 | Collins | 206/312 |

*Primary Examiner*—David T. Fidel
*Attorney, Agent, or Firm*—Nikaido, Marmelstein, Murray & Oram LLP

[57] ABSTRACT

The present invention intends to provide a receiver for a disk in which a disk can be easily attached or detached and a light weight and low costs can be realized because the structure is simple and which is convenient to be held and carried because of being not bulky. According to the invention, the receiver for the storage medium disk is formed in such a manner that as an adhesive layer having adhesive properties, for example, a silicone resin layer whose surface is smooth is laminated onto one or both surfaces of a base plate, thereby forming a disk receiving portion and the storage medium disk is closely adhered to the disk receiving portion so as to be held. It is desired that the silicone resin layer is made of a silicone resin having a hardness of 20 to 70 degrees via a primer. A lid portion whose size is almost equal to that of the base plate can be also connected to the disk receiving portion. When two or more disk receiving portions are arranged, it is preferable to structure the disk receiving portions so as to be foldable.

8 Claims, 3 Drawing Sheets

RECEIVER FOR STORAGE MEDIUM DISK

BACKGROUND OF THE INVENTION

The invention relates to a receiver for a storage medium disk which is suitable for selling and holding a storage medium disk for computer or music such as compact disk, mini disk, CD-ROM, digital video disk, and laser disk.

Hitherto, as a case for selling and holding a compact disk or the like, a case having a structure constructed in such a manner that a main body and a lid which have been generally formed by synthetic resin are movably connected and a tray for receiving a disk is fitted on the inside of the main body has been used. FIG. 8 shows an example of a conventional case for receiving a compact disk. A case 1 for receiving comprises: a main body 3; a lid 5 which is movably connected to the main body 3 by a hinge mechanism; and a tray 7 for receiving a disk which is fitted into the main body 3. The main body 3 is formed by providing a side wall 10 on a rim of a plate portion 9. As for the side wall 10, the side wall which vertically intersects the hinge mechanism is provided so as to be deviated inside from a side surface 11 of the plate portion 9, so that the side wall 10 is fitted into the inside of the lid 5. A plurality of notches 13 are provided in the upper portion of the side wall 10.

The lid 5 is formed by setting side walls 17 so as to stand on edges of a plate portion 15. End portions of the side walls 17 on the side of the plate portion 9 are formed so as to be projected from the plate portion 15. Projections 19 provided on the inside of the side walls 17 are movably fitted into holes provided in the side wall 10, thereby assembling the case. The hinge mechanism is constructed by movably inserting the projections 19 into the holes of the side wall 10, so that the main body 3 and the lid 5 can be moved by using the projections 19 as axes. A folded portion 20 is provided on an edge of the lid 5 on the side of the main body 3. Tabs 21 are provided so as to be projected in the internal surfaces of the side walls 17. Printed papers displaying a title, explanations, and the like are held by the folded portion 20 and the tabs 21.

In the tray 7 for receiving the disk, a disk holding portion 25 is provided so as to be projected on the center portion of a concave portion 23 for receiving a disk. The disk holding portion 25 is fitted into a hole of a disk, thereby fixing the disk. The portion 25 also keeps a recording surface of the disk to be out of contact in a floating state. The tray 7 for receiving the disk with the foregoing construction is fitted into the main body 3, so that they are assembled so as to be united.

As mentioned above, in the conventional case for receiving a compact disk, since the disk holding portion 25 for fixing the disk is provided so as to be projected, the thickness of main body 3 becomes thicker by only the height of disk holding portion 25. Although a case having a structure constructed in such a manner that the main body 3 and the tray 7 for receiving the disk are united has been known, a thickness as much as the height of disk holding portion 25 is needed. Therefore, when the disk is sold or held, a large space is needed and it is inconvenient for carrying.

When the disk holding portion 25 is broken, it cannot be used as a case.

There is a problem such that since the case is made of synthetic resin, when the user carelessly drops it, it is easily broken.

Further, in addition to the above-mentioned case, a bag has also been used to receive a disk. Although the bag is cheap, it is inconvenient for taking the disk in and out. Further, there is also a fear that dusts and rubbish are adhered to the recording surface of the disk. Since the bag cannot hold the disk in a fixing state, the recording surface of the disk is in contact with the bag, so that the disk cannot be held in a desirable state.

SUMMARY OF THE INVENTION

The invention is made in consideration of the present situation. According to the invention, there is provided a receiver for a storage medium disk of the following objects.

It is an object of the invention to provide a receiver for a storage medium disk in which a disk can be easily attached or detached, a structure is simple, and a light weight and low costs can be realized.

Another object of the invention is to provide a receiver for a storage medium disk whose thickness is thin and which is conveniently portable.

Still another object of the invention is to provide a receiver for a storage medium disk which can hold a recording surface of a disk to be always in a clean state.

Still another object of the invention is to provide a receiver for a storage medium disk which can hold a plurality of disks.

BRIEF DESCRIPTION OF THE DRAWINGS

The above objects and advantages of the invention will be sufficiently understood from a consideration of the following description and drawings.

DETAILED DESCRIPTION OF PREFERRED EMBODIMENTS

According to the invention, the following construction is derived in order to accomplish the above objects. That is, a receiver for a storage medium disk according to the invention is characterized in that a disk receiving portion is formed by laminating a silicone resin layer whose surface is smooth onto one surface or both surfaces of a base plate and a storage medium disk is closely adhered to the disk receiving portion and is held. It is desirable to form the silicone resin layer for forming the disk receiving portion by a silicone resin having a hardness of 20 to 70 degrees. The silicone resin layer can be directly laminated onto the base plate and it can be also laminated onto the base plate through a primer. Although materials to form the base plate is not particularly limited, the base plate can be mainly made of a paper or a synthetic resin.

Further, it is desirable to connect a lid portion for covering a disk to the disk receiving portion. In order to closely adhere and hold two or more disks to one surface or both surfaces of the base plate, it is also possible to form two or more disk receiving portions by laminating the silicone resin layer onto two or more portions in one surface of the base plate. The two or more disk receiving portions can be also provided so as to be connected via a folding portion. The disk receiving portion can be also formed in such a manner that a concave portion is provided in the base plate and a silicone resin layer is laminated into the concave portion.

In order to explain the invention in more detail, the invention will now be described hereinbelow in accordance with the embodiments shown in the diagrams.

Figure 1:
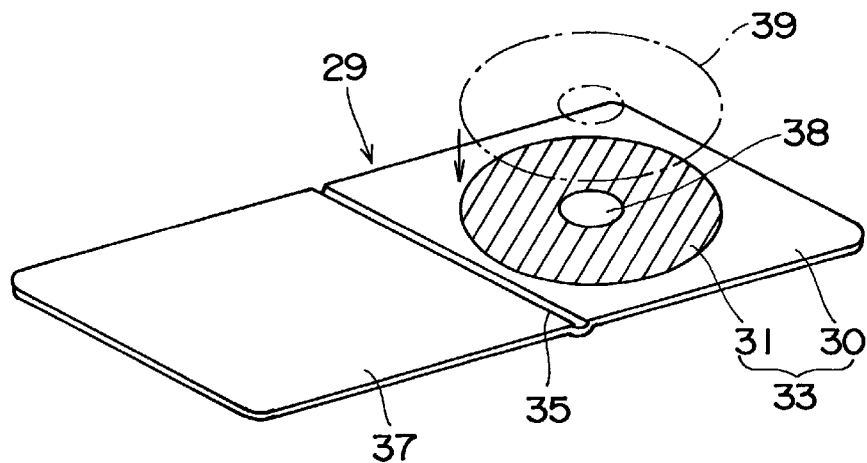
FIG. 1 is a perspective view showing the first embodiment of the invention.

FIG. 1 shows the first embodiment of the receiver for the disk according to the invention. A receiver 29 for a disk comprises a disk receiving portion 33 and a lid portion 37. The disk receiving portion 33 is formed by laminating a silicone resin layer 31 which can closely adhere and hold a disk onto a base plate 30 and is provided so as to be connected to the lid portion 37 through a folding portion 35 formed by a groove for folding. A peeling paper 39 is removably stuck on the silicone resin layer 31 in order to protect the surface. When a disk is received to the receiver 29 for the disk, the peeling paper 39 is peeled, the disk is mounted and closely adhered onto the silicone resin layer 31, and the lid portion 37 is folded and laid.

Materials to form the base plate 30 and the lid portion 37 are not especially limited. As materials, a paper such as paper, paperboard, cardboard, converted paper, and synthetic paper, synthetic resin, metal, synthetic wood, or the like can be used. It is also possible to combine two or more materials among them. For instance, it is sufficient that the base plate 30 is made of a synthetic resin plate and the lid portion 37 is made of a paper. Or, it is also sufficient that both of the base plate 30 and the lid portion 37 are constructed in such a manner that a synthetic resin film is laminated onto a surface of a paper. In the above construction, when the lid portion 37 is made of a foldable material, the folding portion 35 is omitted or it is sufficient to merely set a line for folding.

The invention uses adhesive properties, heat resistance, cold resistance, and the like as characteristics of a silicone resin are used. When a disk is merely mounted, the disk can be closely adhered and be certainly held. Since the silicone resin layer 31 can closely adhere the disk and also can eliminate dusts, rubbish, finger-marks, and the like applied on a recording surface of the disk adhered, the disk is held to be always clean. The surface of the silicone resin layer 31 is smoothly finished. The surface is preferably similar to the surface of a mirror. The silicone resin layer 31 is made of a silicone resin having a hardness of 20 to 70 degrees. As for a plane form of the silicone resin layer 31, if there is a space to which the disk can be closely adhered and held, it is not especially limited. However, it is preferable that an outer rim of the form of the layer 31 is matched to the size of the disk to be received and a circular notch 38 is provided on the center portion.

Figure 2:
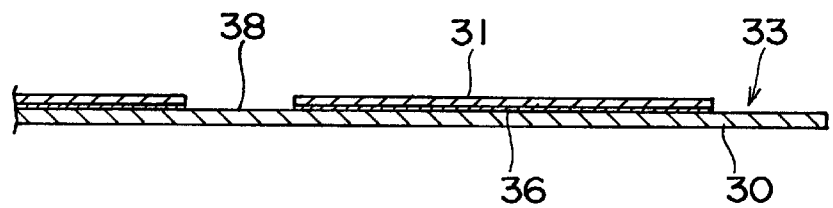
FIG. 2 is a cross sectional view showing an enlarged important portion of the first embodiment.

As shown in FIG. 2, a structural constructing the disk receiving portion 33 by the base plate 30 and the silicone resin layer 31 is formed in such a manner that a primer 36 is performed on a rear surface of the silicone resin layer 31 and the resultant layer is laminated onto the base plate 30. Or, the structural can be also formed in such a manner that the primer 36 is performed to the rear surface of the silicone resin layer 31, the resultant layer is laminated onto a sheet made of a synthetic resin and, after that, the synthetic resin sheet is fixed to the base plate 30 through an adhesive agent. The silicone resin layer 31 can be also laminated onto the base plate 30 by a printing method or a laminating method.

In case of the printing method, a printed surface of the base plate 30 is performed to a primer process, is uniformly finished, is heat-treated, and after that, silicone which has been adjusted by solvent is printed by using a screen of mesh of No. 330 to No. 70. As for the adjustment of the thickness, it is sufficient to execute what is called an overlap printing. After the printing, a temperature of 80° C. to 150° C. is applied and a heat treatment is performed. On the other hand, in case of the laminating method, it is sufficient that a silicone resin sheet which has previously been molded is cut out into a predetermined form, the primer process is performed to the rear surface of the sheet, and the processed sheet is laminated to the base plate 30. As another example of the laminating method, it is sufficient that the silicone resin sheet is performed to the primer process and is temporarily laminated to the synthetic resin sheet and is fixed to the base plate 30 through an adhesive agent applied on the surface of the synthetic resin sheet. In the above embodiment, the disk receiving portion 33 is constructed by laminating one silicone resin layer 31 onto the base plate 30. The number of silicone resin layers is not limited to one but the silicone resin layers can be also arranged in parallel in two or more portions in order to receive two or more disks.

Figure 3:
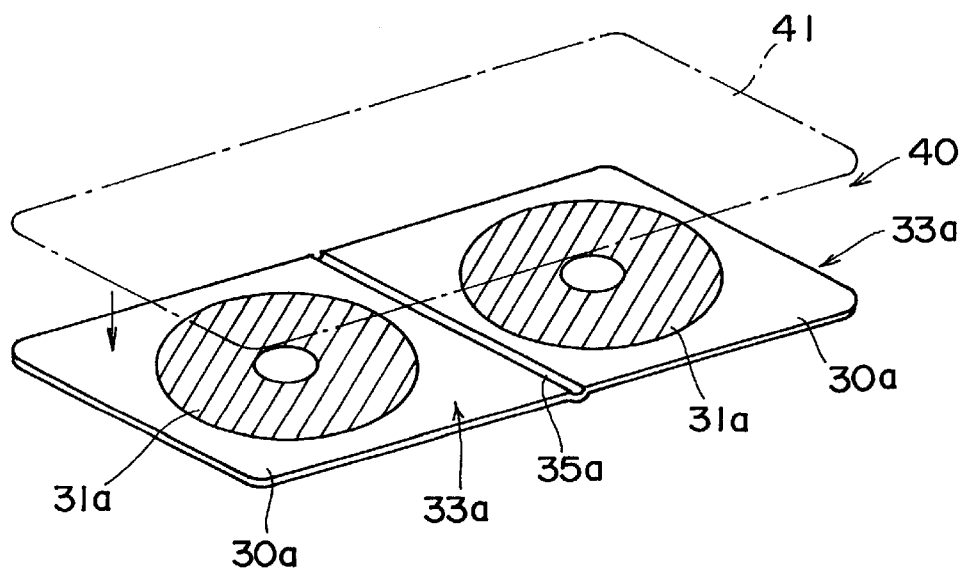
FIG. 3 is a perspective view showing the second embodiment of the invention.

FIG. 3 shows the second embodiment of the receiver for the disk according to the invention. The embodiment has a structure in which a disk receiving portion is also used as a lid portion and which is constructed in such a manner that the disk receiving portions in the first embodiment are connected via the folding portion. That is, a receiver 40 for disks has two disk receiving portions 33a constructed by laminating silicone resin layers 31a for closely adhering and holding disks onto a base plate 30a. The two disk receiving portions 33a are connected via a folding portion 35a. A peeling paper 41 is removably adhered to the silicone resin layers 31a in order to protect the surfaces. When the disks are received to the receiver 40 for the disks, the peeling paper 41 is peeled, two disks are mounted and closely adhered onto the silicone resin layers 31a, respectively, and both of the disk receiving portions 33a are folded. Although the construction in which the two disk receiving portions 33a are connected has been described in the above embodiment, three or more disk receiving portions can be connected. In case of connecting three or more disk receiving portions, they can be alternately folded like bellows.

The peeling papers 39 and 41 in the disk receiving portions 33 and 33a can be also formed in the same forms as those of the silicone resin layers 31 and 31a, respectively. On the internal surfaces or external surf aces of the base plates 30 and 30a and the lid portion 37, an illustration, a title, an explanation, a catch phrase, publicity, and the like for displaying recording contents of a disk can be color-printed. The silicone resin layers 31 and 31a can be provided on the printing. As mentioned above, in case of arranging the silicone resin layers 31 and 31a on the printing, it is desirable to use a transparent or semitransparent silicone resin layer. Materials of the base plate 30a, a forming method of the silicone resin layers 31a, a display by printing, and the like are the same as those of the first embodiment.

In the following embodiments as well, they are similar to the above. Therefore, in the following description, the explanation with respect to the same construction will be omitted in order to simplify.

Figure 4:
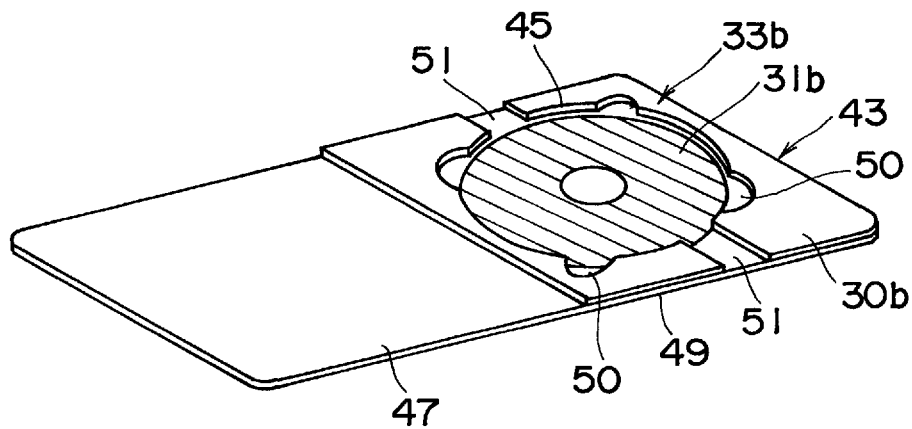
FIG. 4 is a perspective view showing the third embodiment of the invention.
Figure 5:
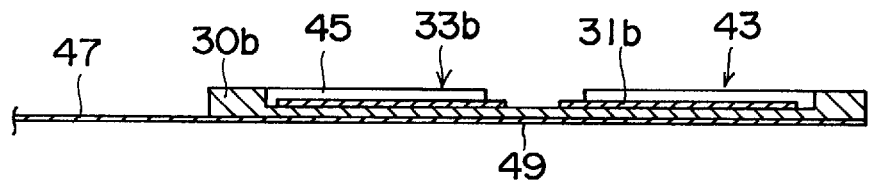
FIG. 5 is a cross sectional view showing an enlarged important portion of the third embodiment.

FIGS. 4 and 5 show the third embodiment of the receiver for the disk according to the invention. In the embodiment, a disk receiving portion is arranged in a concave portion. That is, a base plate 30b is formed by a cardboard such as a corrugated paper and a concave portion 45 for receiving a disk is arranged on the center portion. A silicone resin layer 31b for closely adhering and holding a disk is laminated into the concave portion 45, thereby forming a disk receiving portion 33b. A receiver 43 for a disk is formed in such a manner that a paper whose size is about twice as large as that of the base plate 30b and in which a half portion is used as a lid portion 47 and another half portion is used as an adhering portion 49 is provided for the external surface of the disk receiving portion 33b and the disk receiving portion 33b is adhered to the adhering portion 49. It is sufficient that the depth of concave portion 45 is set to be almost equal to or less than the thickness of disk. In the diagram, reference numerals 50 and 51 denote fingering slots for taking out a disk.

Figure 6:
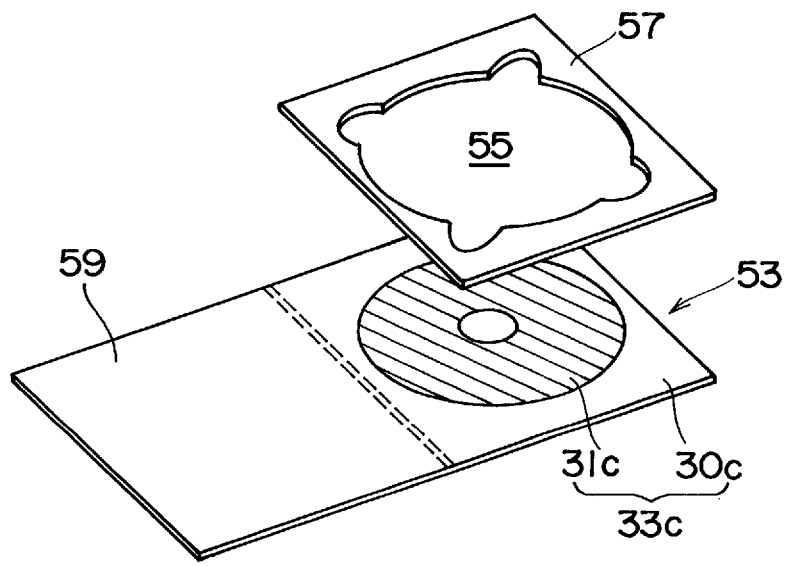
FIG. 6 is a perspective view showing the fourth embodiment of the invention.

FIG. 6 shows the fourth embodiment of the receiver for the disk according to the invention. A receiver 53 for a disk in this embodiment is constructed by laminating a frame 57 onto the disk receiving portion 33 of the first embodiment. That is, the receiver 53 for the disk comprises: the frame 57 having a hole 55 to which the disk can be inserted; and a disk receiving portion 33c which is constructed so as to be connected to a lid portion 59. The disk receiving portion 33c is formed by laminating a silicone resin layer 31c onto a base plate 30c. The receiver 53 for the disk is formed by uniting and fixing the frame 57 to the base plate 30c so that the silicone resin layer 31c is located in the hole 55, and receives the disk in the hole 55. When a concave portion is formed due to the frame 57 and the formed concave portion is used as a disk receiving portion 33c, the silicone resin layer can be easily formed as compared with that in the third embodiment. By receiving the disk into the concave portion as in the third and fourth embodiments, the disk can be more safely held.

Figure 7:
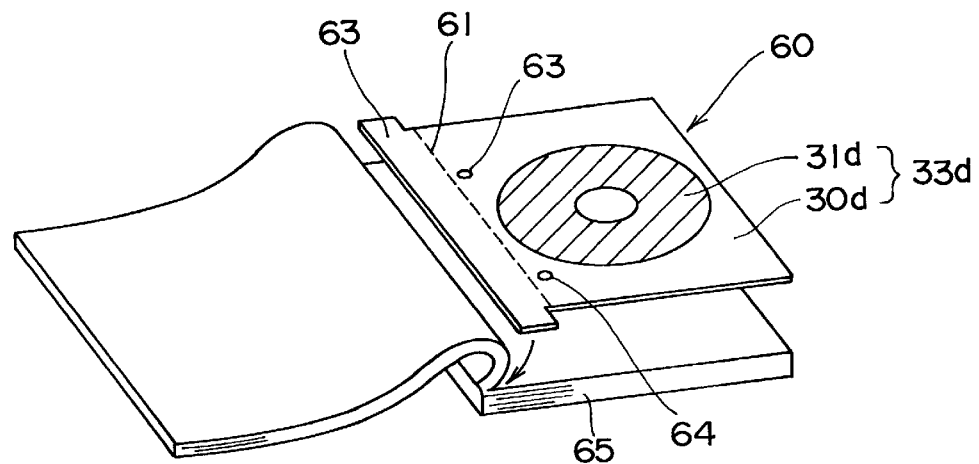
FIG. 7 is a perspective view for explanation showing a use example of filing in a book.
Figure 8:
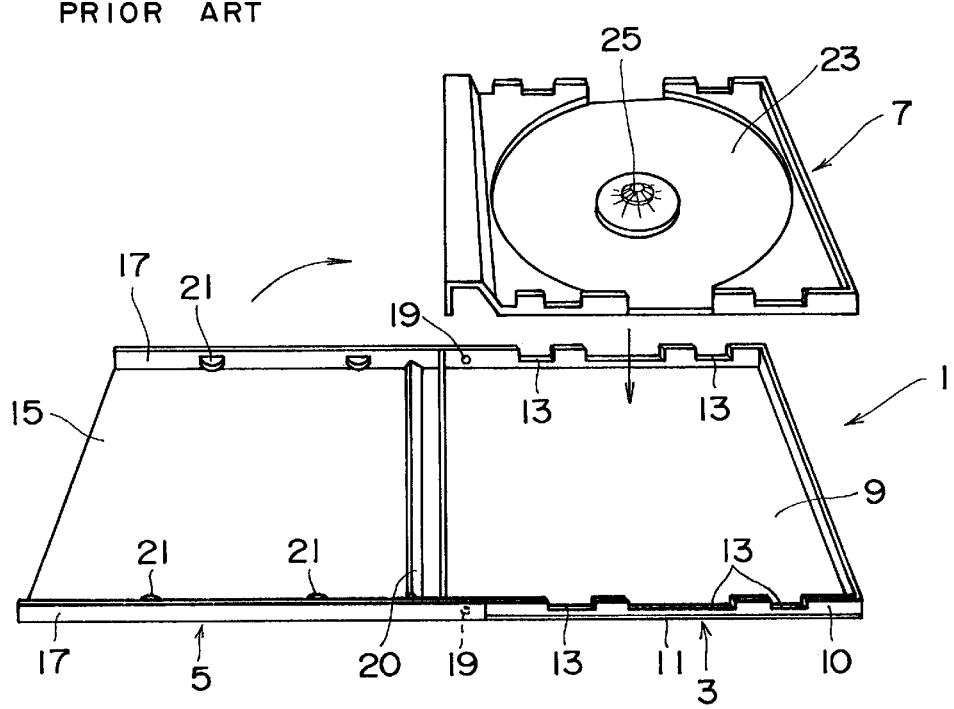
FIG. 8 is a divisional perspective view of a conventional case for receiving a compact disk.

Further, FIG. 7 shows a use example of the receiver for the storage medium disk according to the invention. A receiver 60 for a disk is constructed in such a manner that a disk receiving portion 33d is formed by laminating a silicone resin layer 31d onto a base plate 30d and a binding margin 63 is connected to the base plate 30d via a cutting line 61. When the receiver is filed in a book 65, the disk is closely adhered to the silicone resin layer 31d and is then hermetically sealed by providing a cover for covering the disk so as to be united with the receiver. By filing the binding margin 63 in the book 65, the receiver can be set so as to be united with the book. The base plate 30d can be formed so as to be extremely thin. By forming the base plate so as to be thin, an increase in thickness of book can be prevented, so that the thickness of book 65 can be minimized.

As shown in FIG. 7, in case of using the receiver for the disk filed in the book as a sole receiver for the disk, it is sufficient to cut the receiver from the binding margin 63. When holes 64 for a binder are formed, after the receiver was cut apart, it can be held by filing in the binder. The receiver can be also used without be cut apart from the book 65 by removing only a cover. It is also possible that the binder margin 63 is not arranged, only a disk receiving portion 33d is received in a bag, and the bag is filed in the book. In recent years, as for magazines for computers, music, and the like, there is a case where a disk as an appendix is united with a book and is then sold. Since the receiver for the disk according to the invention can be formed in an extremely thin type, in addition to file it in the book, it is remarkably effective to hold and carry it.

In the above embodiments, the receiving portion for the storage medium disk has been formed by arranging the silicone resin layer on one surface of the base plate. It is also possible to provide the silicone resin layer on the both surfaces of the base plate. In this case, it is desirable to provide the lid portions on the both surfaces. In the receiver for the disk, it is also possible to properly omit the lid portion. In order to closely adhere and hold a disk so as to be removable, the silicone resin is preferable. In place of the silicone resin, for example, a mending tape or an exfoliative adhesive agent can be used.

Advantages of the present invention have become apparent from the above descriptions. Since the receiver for the storage medium disk according to the invention is formed by laminating the silicone resin layer on the flat base plate, the thickness of base plate is hardly increased. Therefore, even in case of allowing the receiver to hold a disk, the thickness of base plate is merely added to the thickness of disk. In case of using adhesive properties of the silicone resin, the disk can be easily attached or detached and can be closely adhered and held as a whole. There is also a secondary effect such that dusts, rubbish, and the like are eliminated, so that the recording surface of the disk is always held to be clean. The receiver for the disk according to the invention has a simple structure, so that it is possible to realize a light weight and low costs. Since the thickness is thin, it is convenient to hold and carry it. It is possible to print arbitrary characters or illustrations on the base plate. Therefore, it is unnecessary to separately form a printed paper and a case as in the conventional one. The structure can be simplified by uniting the both, so that the whole thickness can be thinned as much.

What is claimed is:

1. A receiver for a storage medium disk, said receiver comprising an adhesive layer whose surface is smooth and has adhesive properties for removably mounting a disk onto said adhesive layer, wherein said adhesive layer is laminated onto at least one surface of a base plate, thereby forming a disk receiving portion for closely adhering to and holding a storage medium disk, and wherein said adhesive layer comprises silicone resin having a hardness of 20 to 70 degrees.

2. The receiver according to claim 1, wherein said base plate comprises at least one of a paper and a synthetic resin and said adhesive layer comprises the silicone resin layer laminated onto the base plate through a primer.

3. The receiver according to claim 1; wherein a lid portion for covering said disk receiving portion is connected to said base plate.

4. The receiver according to claim 1, wherein said disk receiving portion is formed by laminating the silicone resin layer into the inside of a concave portion arranged in the base plate and a lid portion for covering a disk is connected to said disk receiving portion.

5. A receiver for a storage medium disk, wherein an adhesive layer whose surface is smooth and has adhesive properties for removably mounting a disk is laminated onto at least one surface of a base plate, thereby forming at least two disk receiving portions, wherein said adhesive layer is made of a silicone resin having a hardness of 20 to 70 degrees.

6. The receiver according to claim 5, wherein said base plate comprises at least one of a paper and a synthetic resin and said silicone resin layer is laminated onto the base plate through a primer.

7. The receiver according to claim 5 or 6, wherein said at least two disk receiving portions are connected by a folding portion.

8. The receiver according to any one of claim 5 or 6, wherein said at least two disk receiving portions are formed by laminating the silicone resin layer onto the inside of at least one concave portion provided in the base plate.

* * * * *